W. M. CONGER.
Dust-Pan Brush-Holders.

No. 126,931. Patented May 21, 1872.

Witnesses: Inventor:

UNITED STATES PATENT OFFICE.

WALTER M. CONGER, OF NEWARK, NEW JERSEY.

IMPROVEMENT IN DUST-PAN BRUSH-HOLDERS.

Specification forming part of Letters Patent No. 126,931, dated May 21, 1872.

Specification describing a certain Improvement in the Construction of Combined Dust-Pans and Brush-Holders, invented by WALTER M. CONGER, of Newark, Essex county, New Jersey.

I have devised a new means of attaching together a dust-pan and brush, which is set forth in full in another application for patent of even date herewith and need not be here repeated. It calls for a broad hook of spring-brass or analogous sheet metal secured to the handle.

I find that the presence of the hook is greatly in the way of richly decorating or even plainly japanning the dust-pan if it is attached at an early stage, and that no obvious means of attachment of the hook can be availed of afterward without destroying some of the finished work. Soldering can be effected, but only at the expense of the destruction of the japanning for a considerable space adjacent.

I get over the difficulties by providing the dust-pan with means for afterward attaching the hook, then japanning and decorating, and afterward attaching the hook by springing it into its place. The necessary elasticity to allow the hook to perform all its functions as a spring-hook affords a great facility for this mode of attaching. I provide the hook with locking-points to engage in holes in the dust-pan, and after being forcibly strained to allow it to engage, it retains its place strongly and permanently.

The following is a description of what I consider the best means of carrying out the invention.

The accompanying drawing forms a part of this specification.

Figure 1:
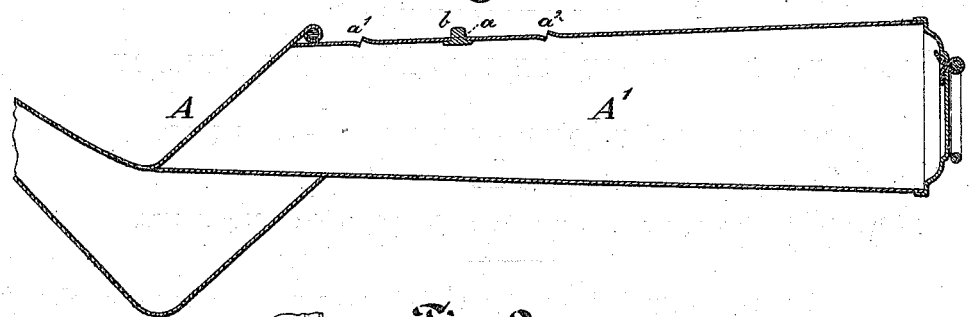
Figure 2:
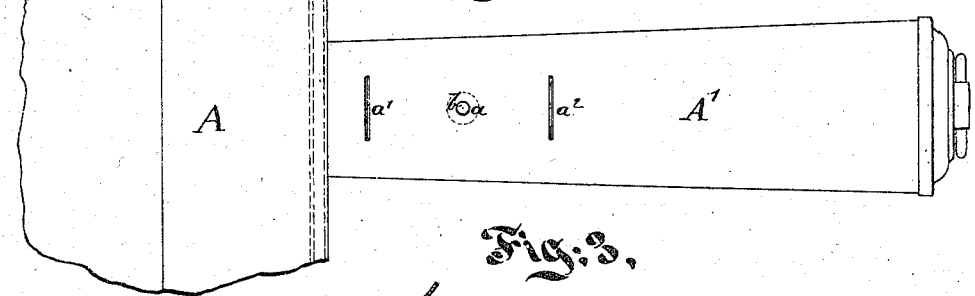
Figure 3:
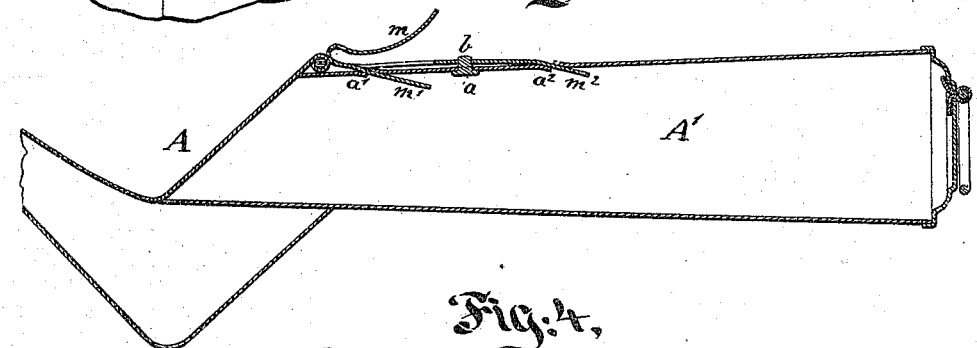
Figure 4:
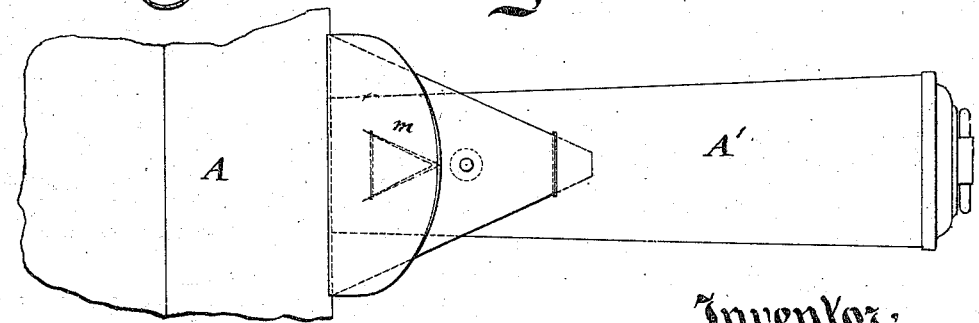

Figure 1 is a vertical section, showing the handle fully prepared to receive the spring-hook. Fig. 2 is a plan view of the same. Fig. 3 is a vertical section with the spring-hook in place, and Fig. 4 is a plan view of the same.

Similar letters of reference indicate like parts in all the figures.

A is the body of the dust-pan, and $A^1$ the handle. The latter is punched or otherwise formed with three holes, $a$, $a^1$, and $a^2$. These holes are preferably produced before the material is bent around to form the handle. The central hole $a$ is round, the others are long and narrow, as shown. After the handle is partially formed by the bending of the tin-plate, by a bending-machine, or otherwise, a rivet, $b$, is set in the hole $a$, being introduced from the inside, and is firmly set by soldering. The result is a projecting spur, formed by the body of the rivet projecting through the hole $a$.

In this condition the handle is soldered properly to the body A, and all is japanned and decorated ready to receive the spring-hook. The latter is marked $m$, and is cut and bent by dies, or otherwise, as shown, so as to present two points, $m^1$ and $m^2$, adapted to enter and hold firmly in the long and narrow holes, $a^1$ and $a^2$. The spring-hook $m$ $m^1$ $m^2$ is now forcibly bent by the thumb and finger, or by any suitable tool, to an extent so as not to cause a permanent set, but only to avail of its elasticity to allow the points $m^1$ and $m^2$ to be inserted in the holes $a^1$ $a^2$. So soon as they are fully in place and the metal is allowed to act by its elasticity and assume the form to which it has been previously set, the hole $a$ engages with the projection $b$ and holds the hook firmly against escaping. It remains strongly attached to and forms a permanent part of the dust-pan. It springs as required to seize and release the brush, but such springing has no effect to disturb its firm attachment to the dust-pan.

The hook may be plated, varnished, bronzed, or otherwise surfaced, at will, as it is exposed to no heat or acid in joining it to the dust-pan.

I claim as my invention—

The elastic hook piece $m$ formed with a hole, $a$, and locking parts $m^1$ $m^2$, in combination with a dust-pan formed with a projection, $b$, and recesses $a^1$ $a^2$, adapted to serve together, as and for the purposes herein set forth.

In testimony whereof I have hereunto set my hand this 9th day of April, 1872, in the presence of two subscribing witnesses.

WALTER M. CONGER.

Witnesses:
ARNOLD HÖRMANN,
WM. C. DEY.